United States Patent Office 3,521,487
Patented July 21, 1970

3,521,487
DIFFERENTIAL PRESSURE FLOWMETER RUN
Lloyd T. Akeley, Charlestown, N.H., assignor to The Foxboro Company, Foxboro, Mass., a corporation of Massachusetts
Filed Mar. 21, 1968, Ser. No. 714,843
Int. Cl. G01f 1/00
U.S. Cl. 73—211                1 Claim

ABSTRACT OF THE DISCLOSURE

A meter run in the form of a flowmeter assembly using an element such as an orifice plate with special upstream and downstream structures and pressure tap formations to improve performance predictability, especially for small flowmeters and small flows.

---

Figure 1:
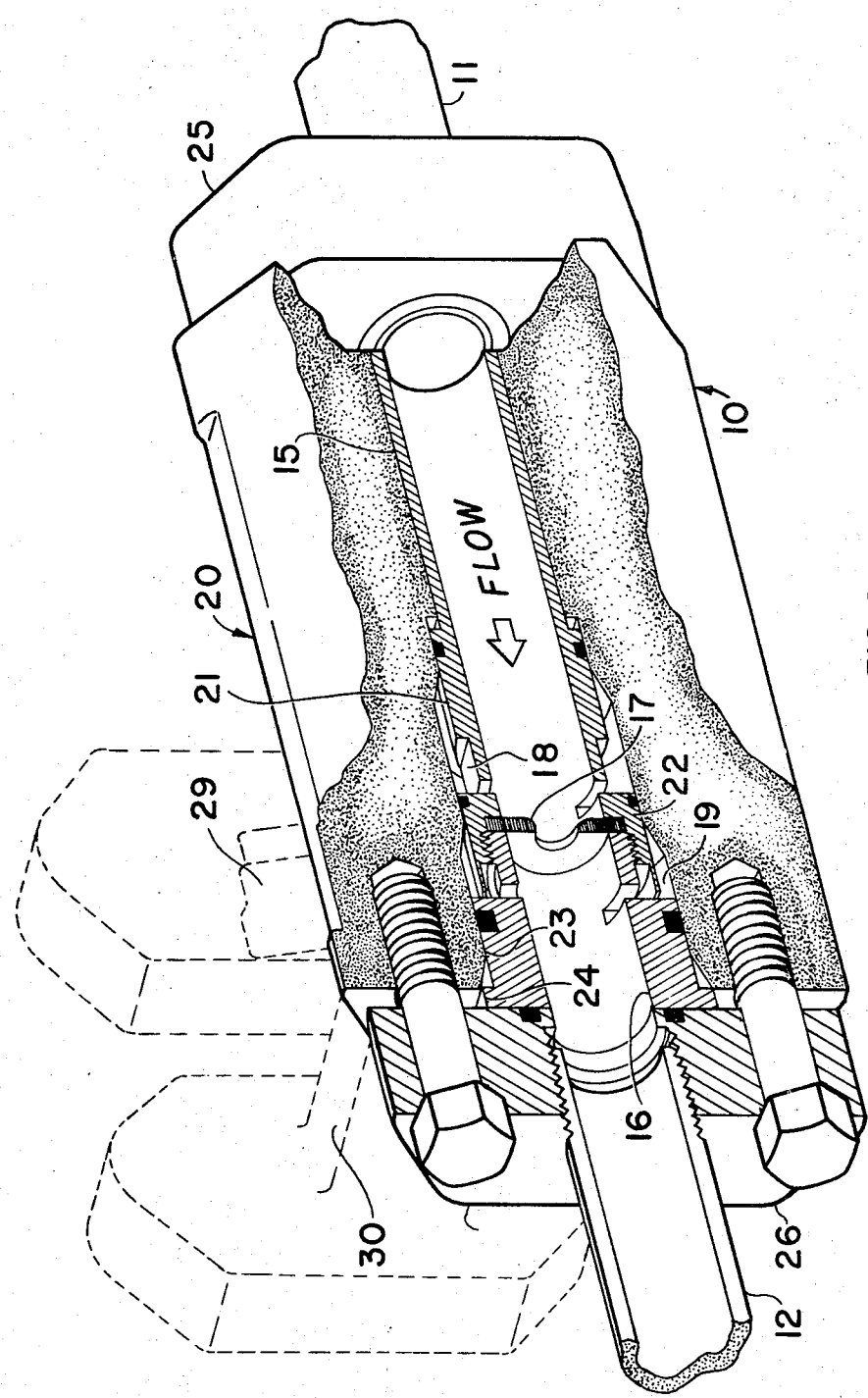

This invention relates to the measurement of fluid flow. It is particularly concerned with flow rate meters of the "head" type. In this type the measurement is based on a differential pressure generated by the flow of fluid through a restriction, such as an orifice inserted in a flow pipeline. As an example, such a restriction may be provided by an orifice plate. The differential pressure is applied to a transmitter, to provide a working output signal representative of the flow rate of the fluid being measured.

Various parameters affect the reproducibility and predictability of accuracy of such flow meter. Among these are pipe and orifice diameters, concentricity of the orifice and/or of the flow profile of the fluid flow, pipe smoothness and contour, length and form of approach, and exit to and from the orifice plate, and the nature and location of pressure take-off taps upstream and downstream of the orifice plate.

The problems of such predictability are especially acute in small flowmeters for measuring small flows.

In order to provide significant improvement in handling such parameters, consideration is given to uniting combinations known as meter runs. A meter run is the assembly of the orifice plate, various flanges, approach and exit pipes, and differential pressure taps.

In this invention, significant improvement in measurement predictability is provided by the use of a unitary assembly of a meter run which is installed in a flow pipeline. This invention provides a particularly advantageous meter run in terms of the unique form and interrelation of its various components.

The meter run according to this invention is particularly useful as applied to small flow meters for small flows.

This invention provides an integral meter orifice manifold comprising a manifold housing in which a unitary meter run assembly is detachably mounted.

The meter run of this invention consists of several main parts; a manifold body, a sleeve and a sleeve end. An orifice plate is located and confined in the sleeve, with the sleeve and sleeve end joined end-to-end by screw thread mounting. The sleeve assembly is located and confined in the manifold body when the process connectors are assembled to tie the meter run into the pipe line of the flow to be measured.

The meter run is preferably set up to establish a straight flow path up and down stream of the orifice to produce predictable flow conditions. This eliminates turbulence problems, and provides significant improvement in predictability of orifice discharge coefficient.

The pressure taps are an annulus type preferably ½ pipe diameter upstream and downstream of the orifice. This type of pressure tap is less sensitive to flow stream disturbances as compared to single point pressure taps.

A minimum of disassembling is required to remove the orifice from the meter run for inspection, cleaning, or replacement. In this unit, the larger orifice bores may be coined, and the smaller bores provided with jeweled orifices. The small flowmeter may be of the order of ½-inch flow pipe.

The nature and form of the pressure taps is such as to lend the device of this invention to self-venting or draining. Depending upon the position in which the meter run is mounted, gas bubbles will vent from the run, or a condensate will drain from the run.

The meter run according to this invention as applied to small flows, may achieve predictable accuracy of flow measurement of the order of two percent.

Figure 2:
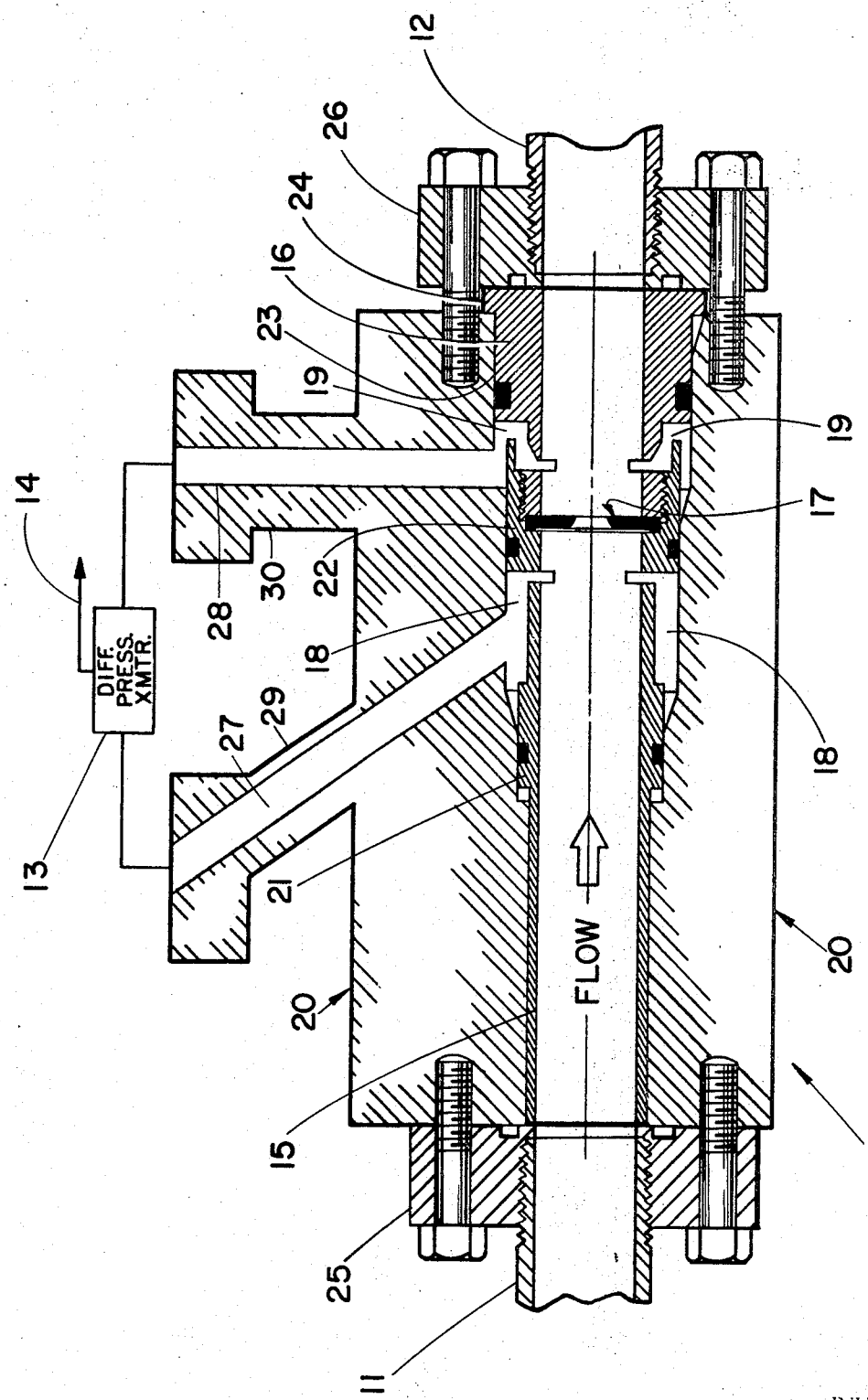

Other objects and advantages of this invention will be in part apparent and in part pointed out hereinafter and in the accompanying drawings, wherein;

FIG. 1 is a cutaway perspective of a flowmeter run as an illustrative embodiment according to this invention; and FIG. 2 is a central section through the structure of FIG. 1, in further illustration thereof.

FIGS. 1 and 2 being two different forms of illustration of the same embodiment of the meter run and system according to this invention, like reference numerals are applied to like elements in both figures. These figures are reversed in aspect for further illustration.

The meter run is indicated generally at 10, mounted in a flow pipeline between an upstream pipe 11 and a downstream pipe 12.

In FIG. 2 the differential pressure output of the device is shown as applied to a differential pressure transmitter 13 of any suitable type, with a working output therefrom indicated at 14.

Major elements of the meter run in a detachable unit comprise an upstream sleeve 15, a downstream sleeve or sleeve end 16, an orifice plate 17, an upstream pressure tap system 18, and a downstream pressure tap system 19. This detachable unit is mounted in a manifold housing 20.

The orifice plate unit of the meter run, comprising the sleeves 15 and 16, with the orifice plate 17 endwise therebetween, is an assembly which is essentially an elongate flow passage device which is increased in outer diameter in steps to provide outer cylindrical portions which increase in size in the direction of the flow of the measured fluid. There are four such diameter steps, two in each of the sleeves 15 and 16.

The manifold body 20 is provided with a transverse mounting opening whose inner diameters match those of the orifice plate unit, except for the final orifice plate unit diameter increase, which is outside the manifold body.

These orifice plate unit outer diameters are indicated at 21, 22, 23 and 24. Each, except 24, is provided with an O ring seal with respect to the manifold body 20. Diameters 21 and 22 straddle the pressure tap system 18, and diameters 22 and 23 straddle the pressure tap system 19. The diameter 24 provides an abutting shoulder against the outside wall of the manifold body 20 for seating and locating the orifice plate unit within the body 20. The diameter 24 is provided with wrench flats for aid in assembly and disassembly of the sleeves 15 and 16 to mount or demount the orifice plate 17 therebetween. The orifice plate unit is removed from the manifold body for such purposes.

The upstream sleeve 15 has its downstream end recessed and shouldered to receive the orifice plate 17. The downstream sleeve 16 has its upstream end reduced in diameter and threaded for joining with the upstream sleeve and in end, ring engagement with the orifice plate to hold it in engagement with the inner shoulder of the upstream sleeve with suitable sealing ring means, as shown.

The upstream flow pipe 11 is secured in flow alignment with the orifice unit by means of a pipe coupling plate 25, which is secured to the manifold body 20, with suitable sealing means, as shown. The downstream flow pipe 12 is similarly connected with the downstream end of the orifice unit, through pipe coupling 26, again with suitable sealing means. This pipe coupler 26 bears on the outer end of the downstream orifice sleeve 16, which in turn is thus held in abutment against the outer wall of the manifold body 20.

The pressure tap systems 18 and 19 are each formed first by a pair of opposite transverse line cuts into their respective orifice plate unit sleeves. Secondly, these line cuts open into annular outer wall recesses in their respective sleeves, these recesses being provided with annular outer walls by the manifold body 20. Finally, at points in these annular recesses away from the pressure tap line cuts, pressure tap output passages 27 and 28 are provided, through support legs 29 and 30, as means for facilitating mounting relation between the meter run system 10 and the differential pressure transmitter 13. These indirect pressure tap systems provide buffer means to protect against sudden pressure changes in the flow line, such as may be occasioned by flow surges. These systems act as averaging manifolds and possible drain exit paths.

This invention accordingly provides a new and useful orifice flowmeter system in the form of a meter run which has significant improvement in operational predictability.

As many embodiments may be made of the above invention, and as changes may be made in the embodiment set forth above without departing from the scope of the invention, it is to be understood that all matters hereinbefore set forth and in the accompanying drawings is to be interpreted as illustrative only and not in a limiting sense.

I claim:
1. A differential pressure flowmeter device for precise measurement of small fluid flows on a basis of reproducibility and predictability of accuracy, for insertion in a flow line,
   said device comprising a one-piece housing, a flow passage through said housing, and a flowmeter run assembly readily mounted in or removed from said housing as a unit assembly with said flow passage, in form and dimension, as a receiver, encloser and supporter for said unit flowmeter run assembly,
   said unit flowmeter run assembly comprising an upstream approach sleeve, a downstream exit sleeve threadedly end-mounted on said approach sleeve, and an orifice plate mounted in said run assembly by clamp mounting between a portion of said upstream approach sleeve and a portion of said downstream exit sleeve, said clamp mounting being accomplished by said threaded end mounting of said exit sleeve on said approach sleeve,
   said upstream sleeve being straight and of sufficient length to avoid flow turbulence in the approach to said orifice plate, in length of the order of several times its diameter, and several times the length of said exit sleeve,
   an end clamp pipe coupling member mounted on said housing at each end of said flow passage, removably clamping said flowmeter run assembly endwise in said housing flow passage,
   a pressure tap in each of said sleeves, a pressure sealing O-ring around said flowmeter run assembly and between said pressure taps, a pressure sealing O-ring around said flowmeter run assembly and upstream of said pressure tap in said approach sleeve, a pressure sealing O-ring around said flowmeter run assembly and downstream of said pressure tap in said exit sleeve,
   a pair of pressure output passages in said housing, each connected to a different one of said pressure taps when said flowmeter run assembly is mounted in said flow passage.

References Cited

UNITED STATES PATENTS

| | | | |
|---|---|---|---|
| 1,904,333 | 4/1933 | Smith | 73—211 |
| 2,260,019 | 10/1941 | Gentile | 73—212 |
| 3,026,727 | 3/1962 | Spurling | 73—211 |

RICHARD C. QUEISSER, Primary Examiner

J. K. LUNSFORD, Assistant Examiner